(12) United States Patent
Kimura (10) Patent No.: US 7,957,607 B2
(45) Date of Patent: Jun. 7, 2011

(54) DECODING APPARATUS, DEQUANTIZATION METHOD, AND COMPUTER READABLE MEDIUM STORING PROGRAM THEREOF

(75) Inventor: Shunichi Kimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1088 days.

(21) Appl. No.: 11/783,205

(22) Filed: Apr. 6, 2007

(65) Prior Publication Data
US 2008/0013840 A1  Jan. 17, 2008

(30) Foreign Application Priority Data

May 1, 2006  (JP) .................... 2006-127319

(51) Int. Cl.
  G06K 9/40  (2006.01)
  G06K 9/36  (2006.01)
  G06K 9/46  (2006.01)
(52) U.S. Cl. ........ 382/268; 382/232; 382/233; 382/248; 382/250
(58) Field of Classification Search .................. 382/268, 382/232, 233, 235, 248, 250, 261, 264
  See application file for complete search history.

(56) References Cited

U.S. PATENT DOCUMENTS

| 5,937,101 | A  | * | 8/1999 | Jeon et al. ................ 382/268 |
| 6,539,060 | B1 | * | 3/2003 | Lee et al. ................ 375/240.29 |
| 6,748,113 | B1 | * | 6/2004 | Kondo et al. ............. 382/232 |
| 2004/0081366 | A1 |  | 4/2004 | Monobe et al. |
| 2005/0100237 | A1 | * | 5/2005 | Kong et al. ............... 382/261 |

FOREIGN PATENT DOCUMENTS

| JP | A 07-154604 | 6/1995 |
| JP | A 07-170518 | 7/1995 |
| JP | A-2002-335405 | 11/2002 |
| JP | A-2004-159311 | 6/2004 |

OTHER PUBLICATIONS

Chen et al. "Adaptive postfiltering of transform coefficients for the reduction of blocking artifacts," IEEE Transactions on Circuits and Systems for Video Technology, vol. 11, May 2001, pp. 594-602.*
Wang, et al. "Adaptive reduction of blocking artifacts in DCT domain for highly compressed images", IEEE Transactions on Consumer Electronics, vol. 50, Issue: 2, 2004, pp. 647-654.*
Luo, et al. "Removing the blocking artifacts of block-based DCT compressed images", IEEE Transactions on Image Processing, vol. 12, Issue: 7, 2003, pp. 838-842.*
Triantafyllidis et al., "Blocking artifact detection and reduction in compressed data," IEEE Transactions on Circuits and Systems for Video Technology, vol. 12, Oct. 2002, 877-890.*
Zakhor; (Mar. 1992); "Iterative Procedures for Reduction of Blocking Effects in Transform Image Coding"; Ieee Transactions On Circuits and Systems for Video Technology; vol. (2); No. (1); pp. 91-95.
Choy, et al.; (Jan. 1997) "Reduction of Block-Transform Image Coding Artifacts by Using Local Statistics of Transform Coefficients".
Mar. 30, 2011 Office Action issued in Japanese Patent Application No. 2006-127319 (with translation).

* cited by examiner

Primary Examiner — Samir A Ahmed
Assistant Examiner — Li Liu
(74) Attorney, Agent, or Firm — Oliff & Berridge, PLC (57) ABSTRACT

There is provided a decoding apparatus that decodes data encoded by transform coding in units of predefined image areas, including a coefficient setting unit that sets modification coefficients for each of the image areas; and a dequantized value generating unit that generates a dequantized value corresponding to a first quantized index value of a target area which is an image area to be modified, based on the first quantized index value of the target area, a second quantized index value of other image area in predetermined relative position to the target area, and the modification coefficients set by the coefficient setting unit.

10 Claims, 12 Drawing Sheets

QUANTIZATION OF JPEG

FIG.2B
RELATED ART

QUANTIZATION OF JPEG 2000

FIG.2C
RELATED ART

QUANTIZATION DOMAIN

FIG.3

RELATED ART

| REFERENCE BLOCK 1 (8×8) | REFERENCE BLOCK 2 (8×8) | REFERENCE BLOCK 3 (8×8) |
|---|---|---|
| REFERENCE BLOCK 4 (8×8) | BLOCK OF INTEREST (8×8) | REFERENCE BLOCK 5 (8×8) |
| REFERENCE BLOCK 6 (8×8) | REFERENCE BLOCK 7 (8×8) | REFERENCE BLOCK 8 (8×8) |

FIG.9B

| $\alpha$ | $\alpha$ | $\alpha$ |
|---|---|---|
| $\alpha$ | $W+\alpha$ | $\alpha$ |
| $\alpha$ | $\alpha$ | $\alpha$ |

DECODING APPARATUS, DEQUANTIZATION METHOD, AND COMPUTER READABLE MEDIUM STORING PROGRAM THEREOF

CROSS-REFERENCE TO RELATED APPLICATIONS

This application is based on and claims priority under 35 USC 119 from Japanese Patent Application No. 2006-127319 filed May 1, 2006.

BACKGROUND

Technical Field

The present invention relates to a decoding apparatus that decodes coded data generated by an encoding process, a dequantization method, and a computer readable medium storing a program thereof. And the present invention relates to a decoding apparatus that dequantizes and decodes coded data generated by an encoding process including data quantization, an associated dequantization method, an associated computer readable medium storing a program thereof, and an associated computer data signal.

SUMMARY

According to an aspect of the present invention, there is provided a decoding apparatus that decodes data encoded by transform coding in units of predefined image areas, including a coefficient setting unit that sets modification coefficients for each of the image areas; and a dequantized value generating unit that generates a dequantized value corresponding to a first quantized index value of a target area which is an image area to be modified, based on the first quantized index value of the target area, a second quantized index value of other image area in predetermined relative position to the target area, and the modification coefficients set by the coefficient setting unit.

BRIEF DESCRIPTION OF THE DRAWINGS

An exemplary embodiment of the present invention will be described in detail based on the following figures, wherein:

FIGS. 1A and 1B illustrate an outline of a transform coding scheme such as JPEG and JPEG 2000, wherein

DETAILED DESCRIPTION

Outline of exemplary embodiments of the present invention is first discussed.

It is commonly practiced to compress image data and the like and reduce the data amount before its preservation, transmission, or the like, because the amount of such data is huge. For, for example, multilevel image data generated by electronically capturing an image of a color document page or photograph by an image scanner and digitizing the image or multilevel image data generated by taking a photograph of a scene or something with a digital camera, its data amount can be lessened by compression in accordance with a lossy coding scheme such as JPEG or JPEG 2000.

A problem with the lossy coding is coding artifacts that result from the lossy coding. Especially, when the JPEG scheme is applied, blocking artifacts (coding artifacts) occurring at boundaries of DCT (Discrete Cosine Transform) blocks of a decoded image are regarded as a problem.

First, a mechanism of how coding artifacts are produced by the lossy coding is described, referring to FIGS. 1A, 1B, and FIGS. 2A to 2C.

Figure 1A:
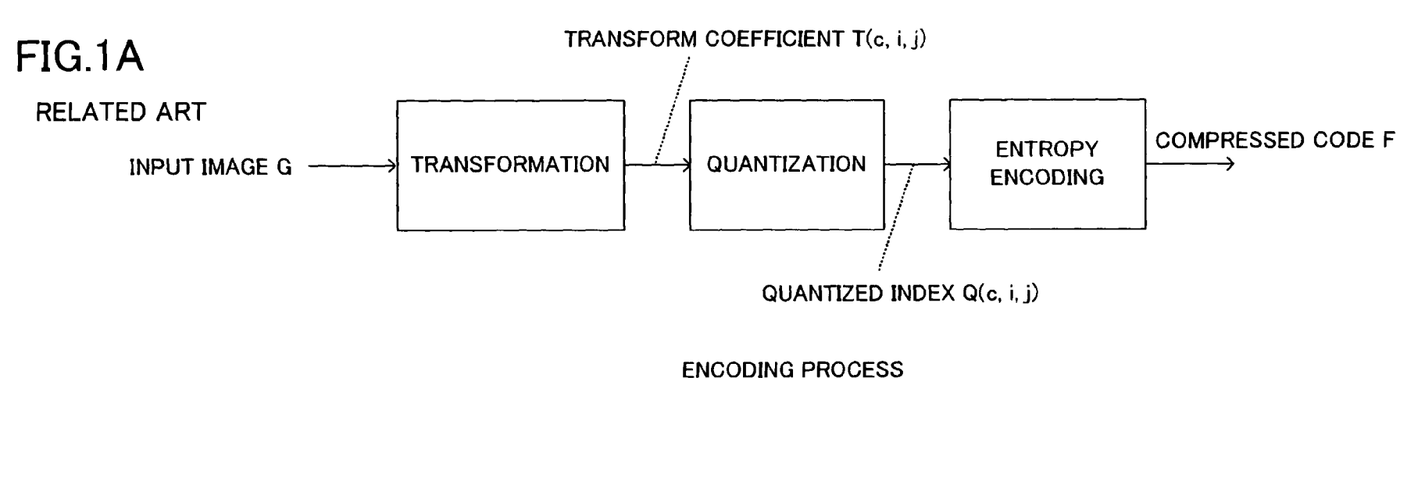
FIG. 1A shows an outline of an encoding process and FIG. 1B shows an outline of a decoding process.
Figure 1B:
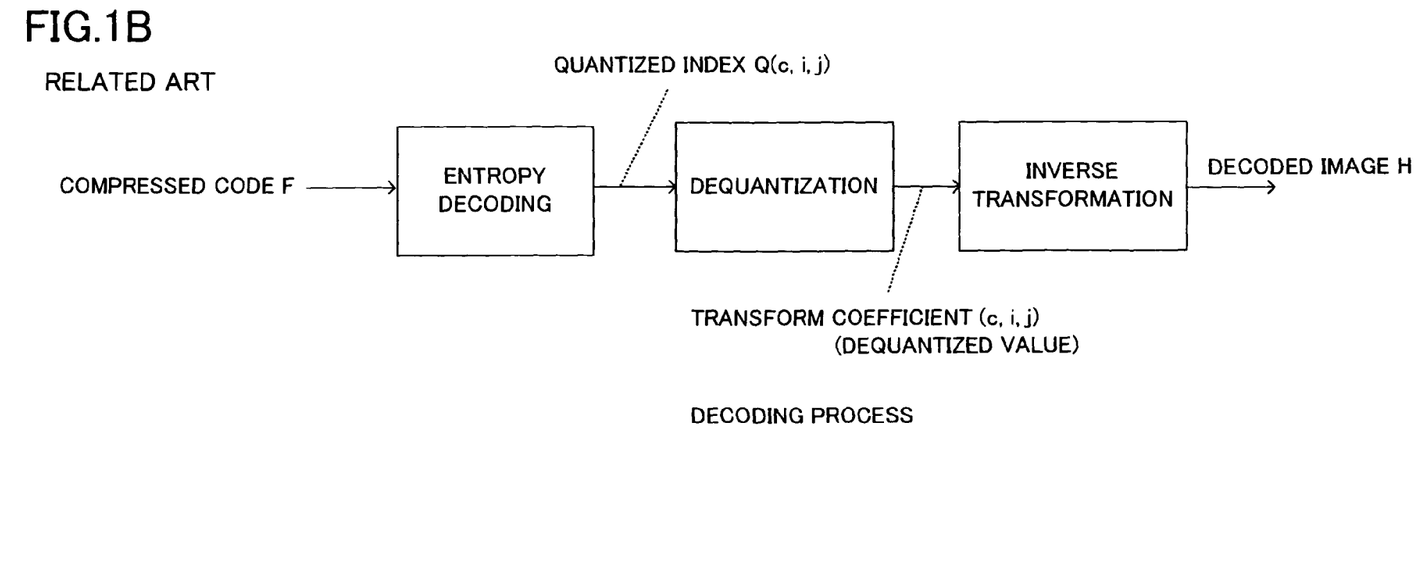

FIGS. 1A and 1B illustrate an outline of a transform coding scheme such as JPEG and JPEG 2000, wherein FIG. 1A shows an outline of an encoding process and FIG. 1B shows an outline of a decoding process.

Figure 2A:
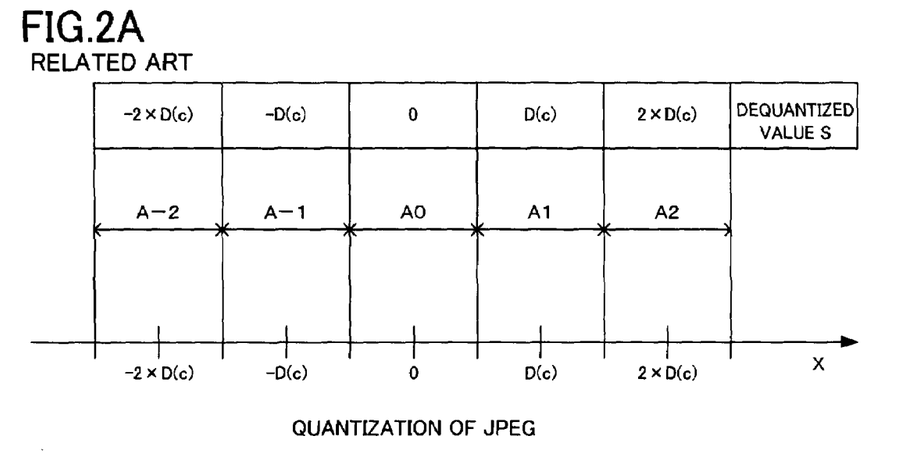
FIGS. 2A to 2C illustrate quantization processing by each transform coding scheme.
Figure 2B:
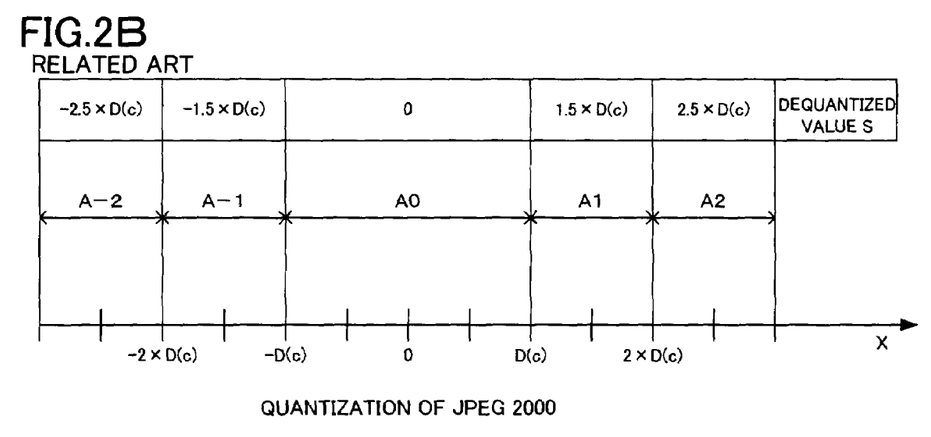
Figure 2C:
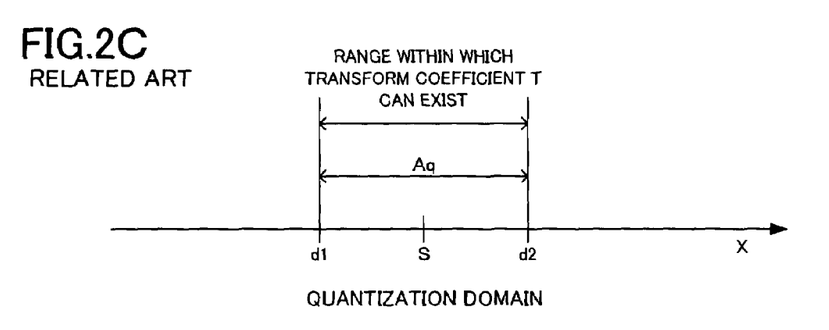

FIGS. 2A to 2C illustrate quantization processing by each transform coding scheme. A transform coefficient $T(c, i, j)$ and a quantized index $Q(c, i, j)$ given in FIGS. 2A to 2C are functions of variables $c, i, j$. A variable $c$ is an index indicating the type of the transform coefficient; for example, in the case of DCT transformation using blocks (image blocks) each having 8×8 pixels, the variable $c$ is a value (an integer or the like from 1 to 64) indicating any of 64 (8×8) transform coefficient types that exist. In the case of wavelet transformation, the variable $c$ is a value indicating any of 1HH, 1LH, 1HL, 2HH, 2LH, 2HL, NLLL components. Variables $i, j$ are those indicating the position of each transform coefficient; for example, in the case of DCT transformation, the c-th transform coefficient in a block which is in the i-th place from the top and the j-th place from the left is represented as $T(c, i, j)$. In the case of wavelet transformation, of the c-th transform coefficient, data which is in the i-th place from the top and the j-th place from the left is represented as $T(c, i, j)$.

As shown in FIG. 1A, in the encoding process of the transform coding scheme, an input image G is transformed by, e.g., discrete cosine transform or wavelet transform, which generates a transform coefficient T of the input image G, and this transform coefficient T is further quantized into a quantized index Q. The quantized index Q is entropy encoded (lossless coding) into compressed code F.

Here, the quantized index is information for identifying a quantized value. The quantized value is a value to which a set of values falling within a certain range (quantized domain) is condensed and may be one of discrete values (in this example, "$-2 \times D(c)$" to "$2 \times D(c)$") representative of quantized domains labeled "A-2" to "A2", respectively, as illustrated in FIGS. 2A to 2C.

The thus generated coded data (compressed code F) is entropy decoded into the quantized index Q, as shown in FIG.

1B. This quantized index Q is the same as the quantized index Q obtained during the encoding.

Further, the quantized index Q is dequantized into a transform coefficient (i.e., a dequantized value) S which is, in turn, inverse transformed, and a decoded image H is generated.

Here, the dequantized value is generated based on the quantized index or quantized value and used for decoding of decoded data; for example, it is a transform coefficient (mapped to the quantized index) according to JPEG or JPEG 2000.

In the above-described process, coding artifacts occur during quantization. When comparing the transform coefficient T with the quantized index Q of an original image in terms of accuracy, the accuracy of the transform coefficient T is generally higher than that of the quantized index Q. Hence, the transform coefficient S reproduced by use of the quantized index Q differs from the initial transform coefficient T. This causes the coding artifacts.

Then, referring to FIGS. 2A to 2C, the quantization and dequantization are described in greater detail.

The quantization is carried out, using quantization step widths (quantization intervals) D(c) which are prepared for each transform coefficient c. A quantization step width D is a function of a transform coefficient type (c). For example, in the case of JPEG, when image data is quantized, its quantized index Q is calculated by the following equation:

$$Q(c,i,j) = \text{round}(T(c,i,j)/D(c))$$

Here, round ( ) is a function that outputs an integer which is the most approximate to an input value.

When the image data is dequantized, its dequantized value S is calculated by the following equation:

$$S(c,i,j) = Q(c,i,j) \times D(c)$$

Alternatively, in the case of JPEG 2000, a quantized index Q and a dequantized value S are calculated by the following equation (1):

$$Q(c,i,j) = \text{sign}(T(c,i,j)) \times \text{floor}(|T(c,i,j)|/D(c))$$

$$\text{If } Q(c,i,j) > 0, \; S(c,i,j) = (Q(c,i,j) + r) \times D(c)$$

$$\text{If } Q(c,i,j) < 0, \; S(c,i,j) = (Q(c,i,j) - r) \times D(c)$$

$$\text{If } Q(c,i,j) = 0, \; S(c,i,j) = 0 \quad (1)$$

Here, sign ( ) is a function that outputs a positive or negative sign; floor is a function that truncates a fractional part to 0; and | | is a symbol denoting an absolute value.

r is a value ranging from 0 to 1 but r=0.5 in typical usage. Although lower bits may not be encoded in the case of JPEG 2000, a concrete example assuming that all bits to the least significant bit are encoded is discussed herein.

In the case of JPEG 2000, decoded images with less artifacts can be obtained by proper setting of the value for modification r given in the equation (1). In this way, the quality of decoded images can be improved by setting the dequantized value off the center of the quantization range in the case of JPEG 2000.

In the case of JPEG also, the quality of decoded images can be improved by adopting a similar value r for modification. In particular, a dequantized value is calculated by use of the following equation (2):

$$\text{If } Q(c,i,j) > 0, \; S(c,i,j) = (Q(c,i,j) + r - 0.5) \times D(c)$$

$$\text{If } Q(c,i,j) < 0, \; S(c,i,j) = (Q(c,i,j) - r + 0.5) \times D(c)$$

$$\text{If } Q(c,i,j) = 0, \; S(c,i,j) = 0 \quad (2)$$

By thus modifying the dequantized value with a proper value r for modification, decoding offering higher reproducibility becomes possible.

Then, the point is how to calculate a proper value r for modification, that is, a concrete modification method.

Figure 3:
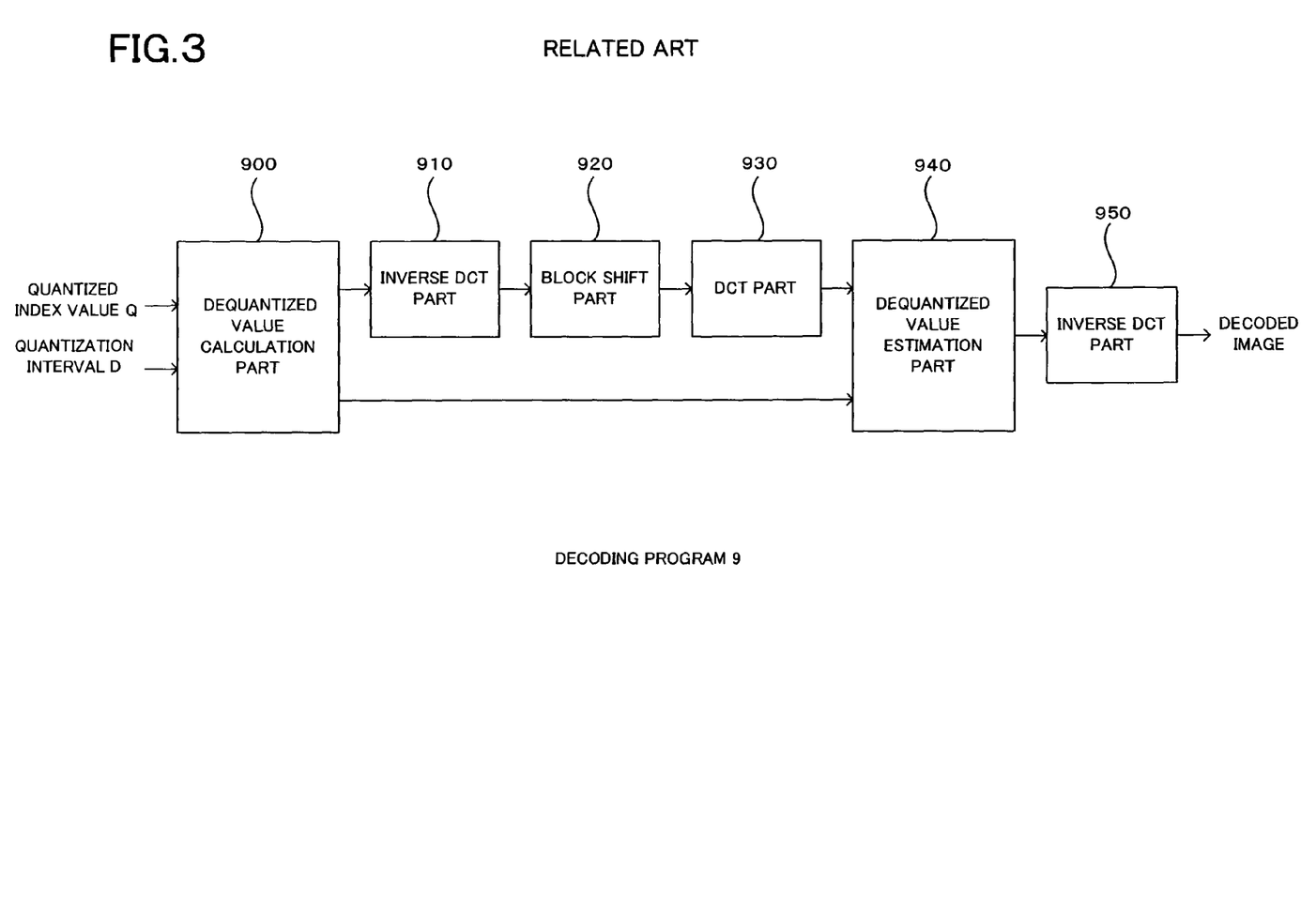
FIG. 3 illustrates a functional structure of a decoding program 9.

For example, like a decoding program 9 which is illustrated in FIG. 3, a possible idea is to shift the position of a block of an image once decoded, calculate transform coefficients at shifted block positions (reference blocks), and calculate a dequantized value using the calculated multiple transform coefficients (calculated for each reference block).

Specifically, a dequantized value calculation part 900 of the decoding program 9 calculates dequantized values based on quantized index values Q and quantization intervals D, an inverse DCT part 910 performs inverse discrete cosine transforms of the calculated dequantized values, thus generating a decoded image. For a block of interest (one of blocks fixed when encoded) with a size of 8×8 pixels, a block shift part 920 shifts its position on all sides and sets up multiple reference blocks, as is illustrated in FIG. 4.

A DCT part 930 performs discrete cosine transforms for the reference blocks set up by the block shift part 920, calculates transform coefficients (of the reference blocks). A dequantized value estimation part 940 estimates a proper dequantized value (i.e., a modified dequantized value) of the block of interest, based on the transform coefficient (i.e., dequantized value) of the block of interest and the transform coefficients of the reference blocks. An inverse DCT part 950 performs inverse discrete cosine transforms for thus estimated dequantized values. In this way, a decoded image with less image deterioration due to quantization can be generated.

However, the decoding program 9 illustrated in FIG. 3 has to perform inverse discrete cosine transforms at least two times (i.e., IDCT by the inverse DCT part 910 and IDCT by the inverse DCT part 950) to obtain a final decoded image.

Figure 4:
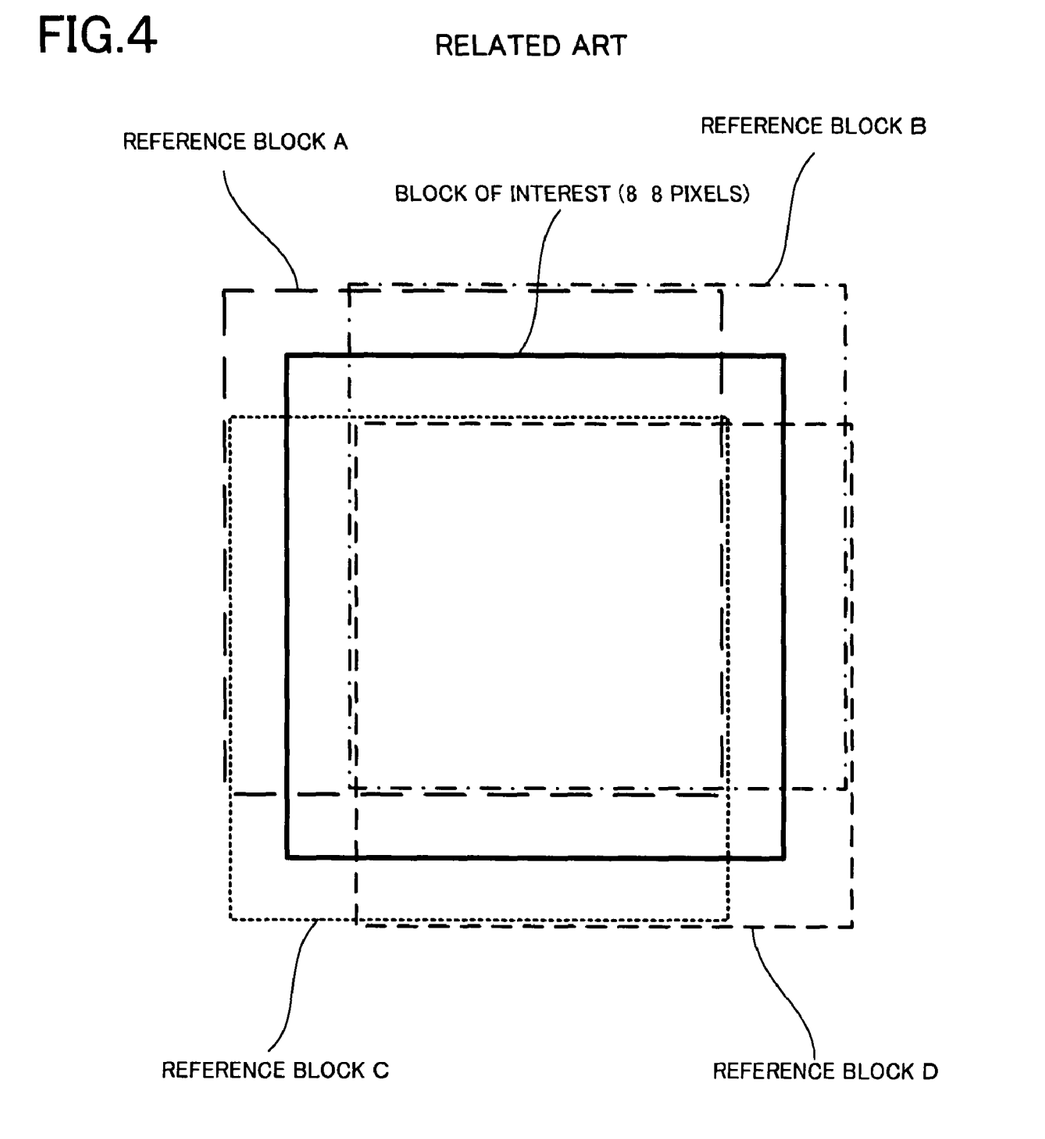
FIG. 4 illustrates block shift positions.

Besides, the decoding program 9 has to perform discrete cosine transforms (i.e., DCT by the DCT part 930) for multiple reference blocks illustrated in FIG. 4.

A decoding apparatus 2 in the present exemplary embodiment refers to the dequantized values of other blocks, when modifying the dequantized value of a block of interest.

More specifically, the decoding apparatus 2 sets modification coefficients based on the dequantized value of the block of interest and the dequantized values of the blocks (reference block) adjacent to this block of interest and modifies the dequantized value of the block of interest, using the set modification coefficients and the dequantized values of the reference blocks.

The dequantized values of the surrounding blocks are considered to well correlate with the dequantized value of the block of interest. By use of the dequantized values of the surrounding blocks, the inverse DCT part 910 and the DCT part 930 in FIG. 3 need not be provided.

[Hardware Structure]

Then, a hardware structure of the decoding apparatus 2 in the present exemplary embodiment is described.

Figure 5:
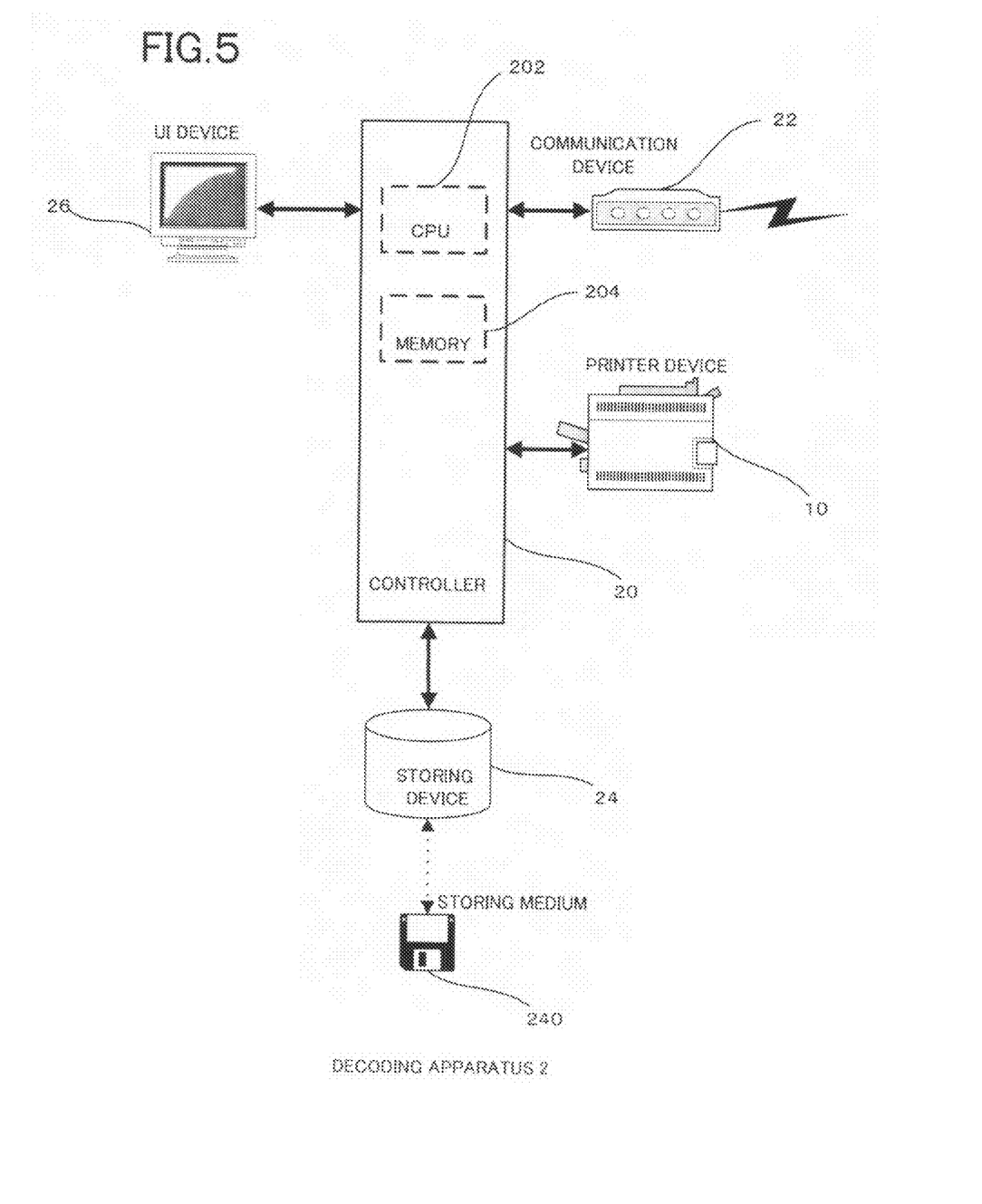
FIG. 5 illustrates a hardware structure of a decoding apparatus 2 to which a dequantization method of an aspect of the present invention is applied, with a controller 20 positioned in the center.

FIG. 5 illustrates the hardware structure of the decoding apparatus 2 to which a dequantization method of an aspect of the present invention is applied, the controller 20 being positioned in the center.

As illustrated in FIG. 5, the decoding apparatus 2 is composed of the controller 20 including a CPU 202, a memory 204, and other components, a communication device 22, a storing device 24 such as a HDD/CD unit, and a user interface (UI) device 26 including a LCD or CRT display, a keyboard, a touch panel, and the like.

The decoding apparatus 2 is, for example, a general-purpose computer in which a decoding program 5 (described below) has been installed and which acquires coded data via the communication device 22, the storing device 24, or the like, decodes the acquired coded data, and transfers decoded data to the printer device 10.

[Decoding Program]

Figure 6:
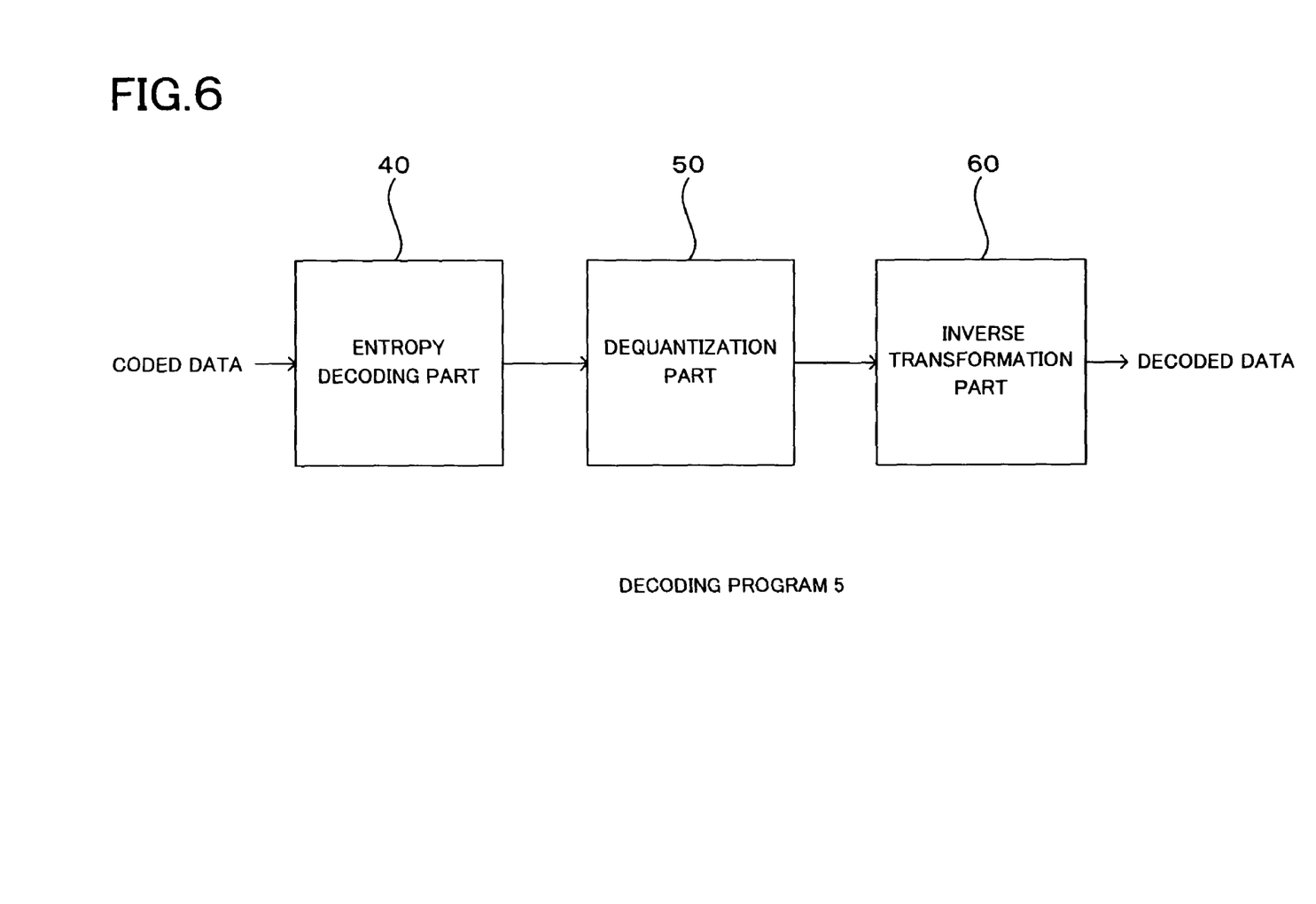
FIG. 6 illustrates a functional structure of a decoding program 5 embodied in a computer readable medium for realizing the dequantization method of an aspect of the present invention when executed by the controller 20 (FIG. 5)

FIG. 6 illustrates a functional structure of the decoding program 5 embodied in a computer readable medium for realizing the dequantization method of an aspect of the present invention when executed by the controller 20 (FIG. 5).

As illustrated in FIG. 6, the decoding program 5 includes an entropy decoding part 40, a dequantization part 50, and an inverse transformation part 60.

The entropy decoding part 40 entropy decodes input coded data and outputs decoded data to the dequantization part 50.

The entropy decoding part 40 of the present example decodes input coded data, generates quantized index values Q, and outputs the generated quantized index values to the dequantization part 50.

The dequantization part 50 generates dequantized values based on the quantized index values input from the entropy decoding part 40 and outputs the generated dequantized values to the inverse transformation part 60.

The inverse transformation part 60 performs inverse transform processing based on the dequantized values input from the dequantization part 50 and generates a decoded image.

The inverse transformation part 60 of this example performs inverse discrete cosine transforms, thus transforming dequantized values into a decoded image.

Figure 7:
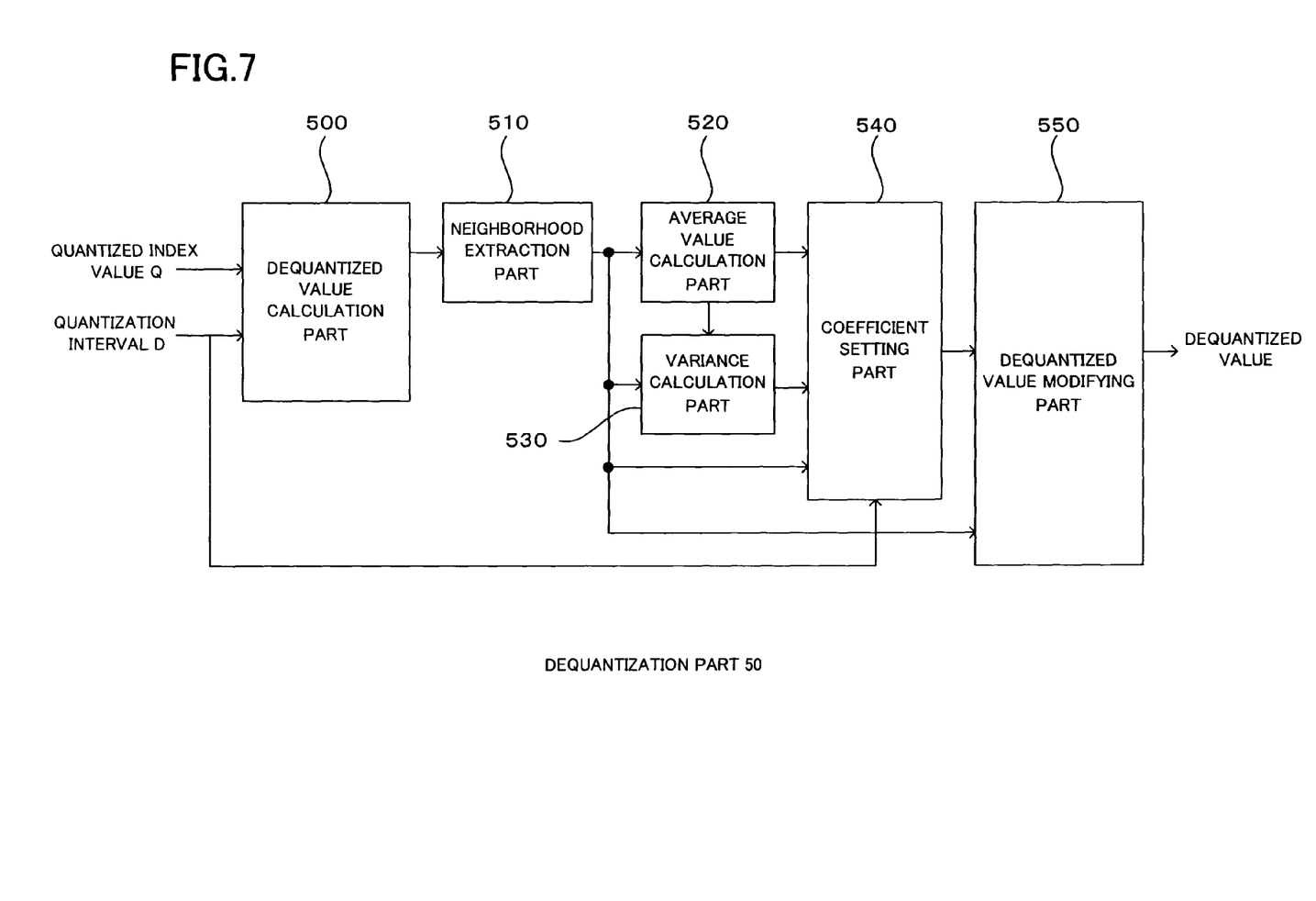
FIG. 7 illustrates in greater detail a dequantization part 50 shown in FIG. 6.

FIG. 7 illustrates in greater detail the dequantization part 50 shown in FIG. 6.

As illustrated in FIG. 7, the dequantization part 50 includes a dequantized value calculation part 500, a neighborhood extraction part 510, an average value calculation part 520, a variance calculation part 530, a coefficient setting part 540, and a dequantized value modifying part 550.

In the dequantization part 50, the dequantized value calculation part 500 calculates dequantized values based on quantized index values input from the entropy decoding part 40 and outputs the calculated dequantized values to the neighborhood extraction part.

The dequantized value calculation part 500 of this example calculates dequantized values S, using input quantized index values Q and quantization step widths D.

When modifying the dequantized value of a block of interest, the neighborhood extraction part 510 extracts the dequantized values of other image blocks in the neighborhood of this block of interest and outputs the extracted dequantized values of the image blocks (the block of interest and other image blocks) to the average value calculation part 520, the variance calculation part 530, the coefficient setting part 540, and the dequantized value modifying part 550.

For example, the neighborhood extraction part 510 extracts the dequantized values of the same component among the dequantized values of a set of image blocks with a size of (2 L+1)×(2 L+1) around the block of interest. Here, the set of image blocks with a size of (2 L+1)×(2 L+1) means a square region where (2 L+1) image blocks exist in both horizontal and vertical directions of the image.

When modifying the dequantized value of a component of interest included in the block of interest, the neighborhood extraction part 510 of this example extracts the dequantized values of the same component (same type) as the component of interest from a set of (2 L+1)×(2 L+1) blocks round this block of interest.

The average value calculation part 520 calculates an average value M of the multiple dequantized values (the dequantized values of the block of interest and its reference blocks) input from the neighborhood extraction part 510 and outputs the calculated average value M to the variance calculation part 530 and the coefficient setting part 540.

The variance calculation part 530 calculates a variance N of the dequantized values, based on the multiple dequantized values (the dequantized values of the block of interest and its reference blocks) input from the neighborhood extraction part 510 and the average value M input from the average value calculation part 520, and outputs the calculated variance N to the coefficient setting part 540.

The coefficient setting part 540 sets modification coefficients for modifying the dequantized value, based on a distribution condition of the dequantized values extracted by the neighborhood extraction part 510.

The coefficient setting part 540 of this example calculates filter coefficients of a two-dimensional FIR filter, based on the average value M calculated by the average value calculation part 520 and the variance N calculated by the variance calculation part 530.

The dequantized value modifying part 550 modifies the dequantized value of the block of interest, based on the modification coefficients set by the coefficient setting part 540 and the dequantized values of the reference blocks extracted by the neighborhood extraction part 510.

The dequantized value modifying part 550 of this example convolutes the dequantized values of the block of interest and its reference blocks, using a two-dimensional FIR filter with a size of (2 L+1)×(2 L+1) blocks having the filter coefficients set by the coefficient setting part 540, thus calculating a modified dequantized value (the dequantized value of the block of interest).

Figure 8:
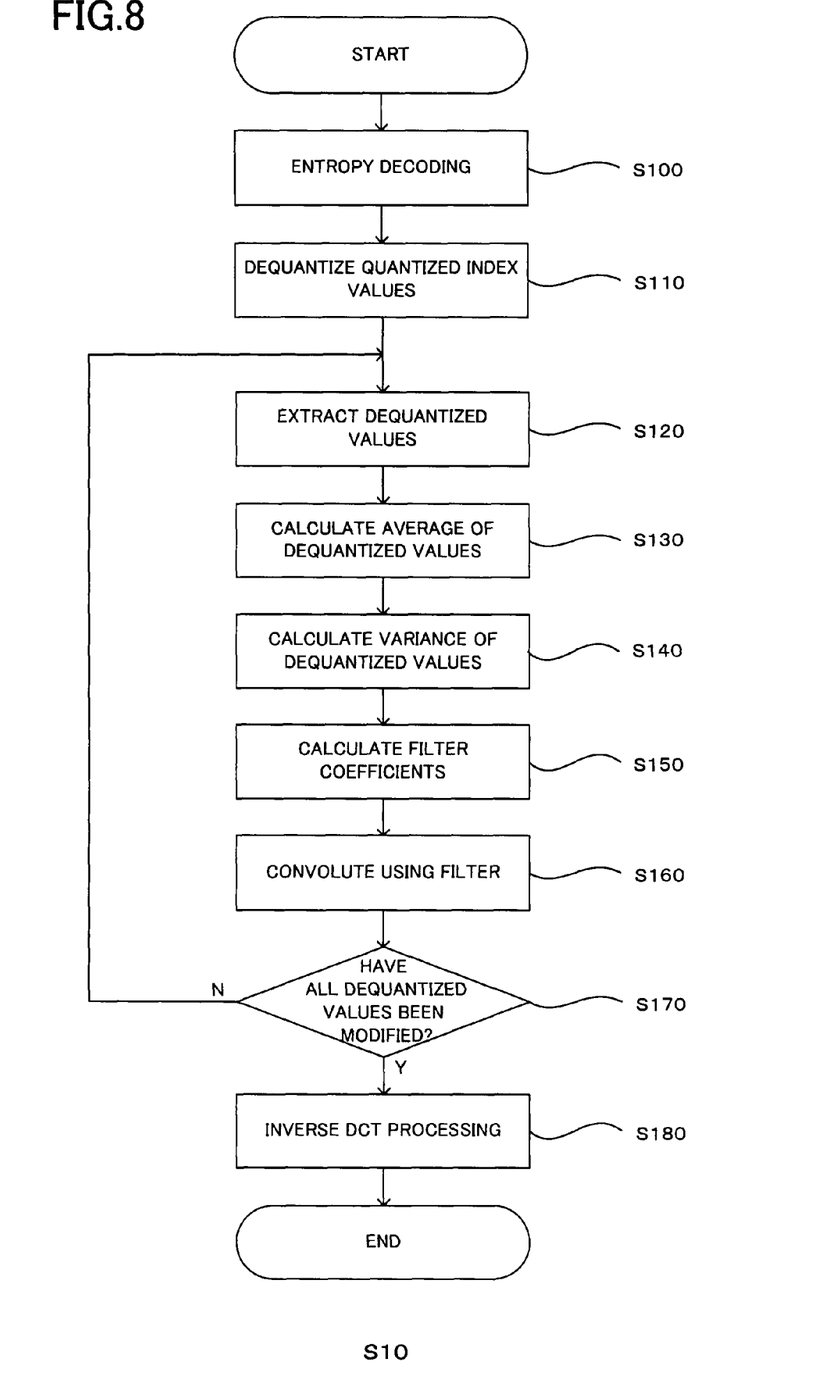
FIG. 8 is a flowchart illustrating a decoding process (S10) by the decoding program 5 (FIG. 6)

FIG. 8 is a flowchart illustrating a decoding process (S10) by the decoding program 5 (FIG. 6).

As illustrated in FIG. 8, at step 100 (S100), the entropy decoding part 40 (FIG. 6) decodes input coded data using a Huffman coding scheme and outputs decoded quantized index values Q to the dequantization part 50.

At step 110 (S110), the dequantized value calculation part 500 (FIG. 7) in the dequantization part 50 dequantizes the quantized index values Q for each block and calculates dequantized values S (before modified) included in each block.

At step 120 (S120), the neighborhood extraction part 510 (FIG. 7) selects the dequantized value S(c, i, j) of a block of interest to be modified from among the dequantized values calculated by the dequantized value calculation part 500.

Moreover, the neighborhood extraction part 510 extracts dequantized values S(c, i+s, j+t) of the same type (frequency component) with regard to the dequantized value S(c, i, j) selected to be modified from multiple blocks (the block of interest and its reference blocks) including the block of interest.

In this example, s and t are integers ranging from −1 to 1. That is, the dequantized values are extracted from nine blocks (the block of interest and its reference blocks) illustrated in FIG. 9A.

The neighborhood extraction part 510 outputs the extracted dequantized values S(c, i+s, j+t) to the average value calculation part 520, the variance calculation part 530, the coefficient setting part 540, and the dequantized value modifying part 550.

At step 130 (S130), the average value calculation part 520 calculates an average value M of the dequantized values S(c, i+s, j+t) input from the neighborhood extraction part 510 and outputs the calculated average value M to the variance calculation part 530 and the coefficient setting part 540.

At step 140 (S140), the variance calculation part 530 calculates a variance N of the extracted dequantized values S(c, i+s, j+t), based on the dequantized values S(c, i+s, j+t) input from the neighborhood extraction part 510 and the average value M input from the average value calculation part 520, and outputs the calculated variance N to the coefficient setting part 540.

The variance N is obtained by squaring the difference between each dequantized value S (c, i+s, j+t) and the average value M and dividing the sum of results by the number of the dequantized values (9 in this example).

Figure 9A:
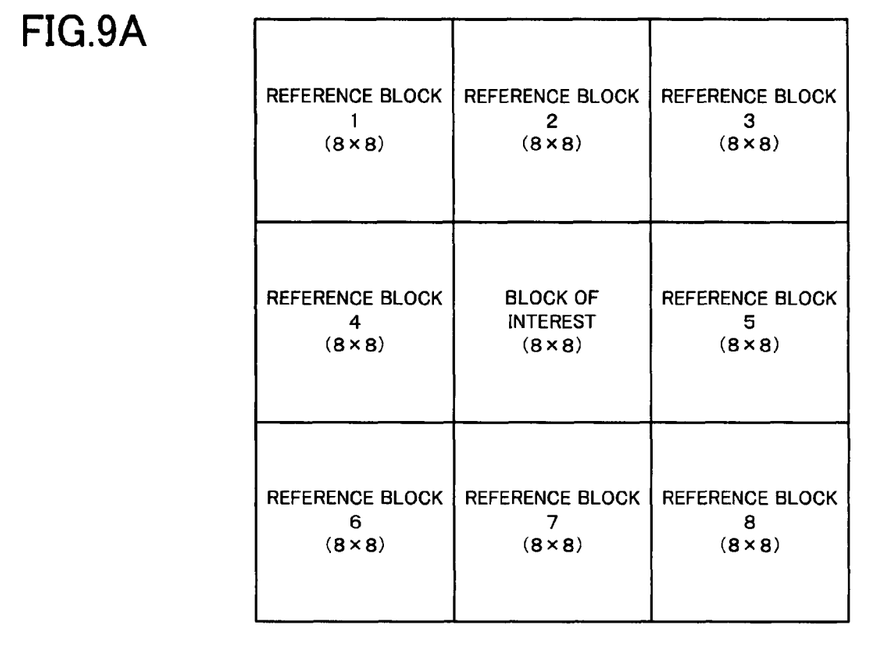
FIG. 9A illustrates reference blocks and FIG. 9B illustrates a filter.
Figure 9B:
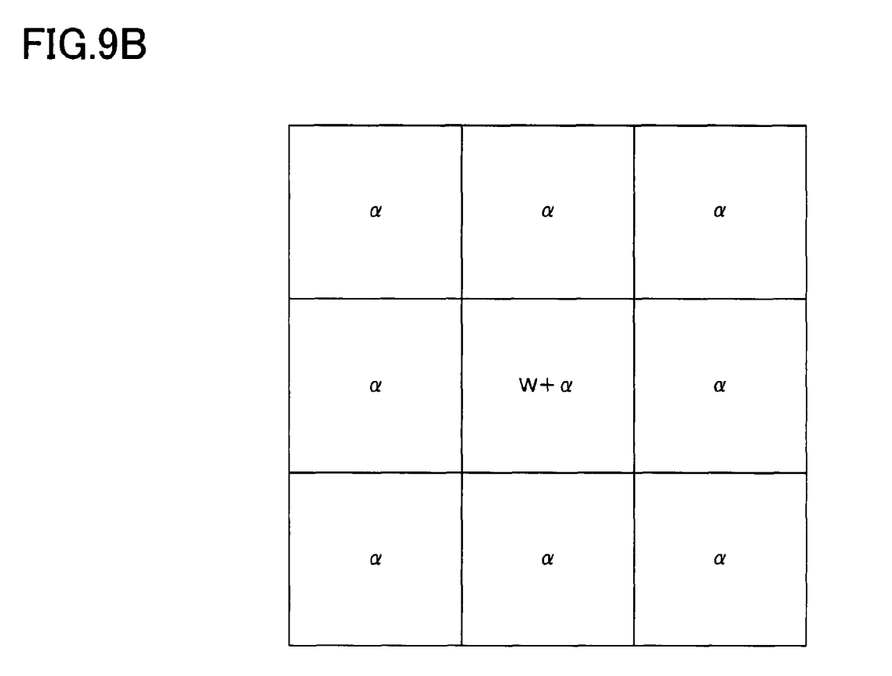

At step 150 (S150), the coefficient setting part 540 calculates filter coefficients ($\alpha$ and W+$\alpha$) illustrated in FIG. 9B, using the average value M input from the average value calculation part 520, the variance N input from the variance calculation part 530, and the quantization step width D(c) input from the entropy decoding part 40, and outputs the calculated filter coefficients to the dequantized value modifying part 550.

In particular, as the coefficient W, the coefficient setting part 540 selects one which is larger of the results of the following calculation formulae A and B, if any result is equal to or greater than 0; otherwise, selects 0 if any result is less than 0.

Calculation formula $A=\{(\text{Variance } N)-D(c)\times D(c)/12\}/(\text{Variance } N)$ Calculation formula $B=1-D(c)/2|S(c,i+s,j+t)-(\text{Average value } M)|$ Calculation formula B is a conditional expression to make a modified dequantized value S'(c, i, j) fall within the quantization domain defined for the original quantized index Q (c, i, j).

Using the calculated coefficient W, the coefficient setting part 540 then calculates the coefficient $\alpha$ by the following equation:

Coefficient $\alpha=(1-W)/(2L+1)^2$ where, L is the distance of a reference block from the block of interest at the center. In this example, L=1, because every reference block is at a range of one block from the block of interest, as illustrated in FIG. 9A. That is, $(2L+1)^2$ equals to the number of dequantized values extracted by the neighborhood extraction part 510 (the number of blocks).

The thus calculated coefficients W and $\alpha$ become the elements of the two-dimensional FIR filter illustrated in FIG. 9B.

At step 160 (S160), the dequantized value modifying part 550 calculates a modified dequantized value SI (c, i, j) by filtering the nine dequantized values S(c, i+s, j+t) input from the neighborhood extraction part 510 by the two-dimensional FIR filter (FIG. 9B) using the filter coefficients input from the coefficient setting part 540.

The calculated dequantized value S'(c, i, j) is output to the inverse transformation part 60 (FIG. 6).

At step 170 (S170), the decoding program 5 determines whether all dequantized values have been modified; if so, the process proceeds to step S180, if at least a dequantized value yet to be modified remains, the process returns to step S120.

At step 180 (S180), the inverse transformation part 60 performs an inverse discrete cosine transform of the dequantized value (modified by the dequantization part 50) input from the dequantization part 50, thus generating a decoded image.

As described above, the decoding apparatus 2 may estimate DCT coefficients before quantization by filtering on DCT blocks.

Besides, the present decoding apparatus 2 may estimate DCT coefficient values (dequantized values) simply by filtering the dequantized values S by the two-dimensional FIR filter.

MODIFICATION EXAMPLE 1

Next, an example of a modification to the foregoing exemplary embodiment is described.

While, in the foregoing exemplary embodiment, an aspect of the invention in which dequantized values are modified has been described, the current invention is not so limited; for example, quantized index values may be modified.

In this case, because the quantized index values Q exist in a smaller dynamic range as compared with the dequantized values S, it is possible to reduce the calculation load with a reduction in data bit width. In calculating the above coefficient W, the quantization step width D(c) is dispensed with and, therefore, the processing becomes simpler.

In the following, modification example 1 is descried.

Figure 10:
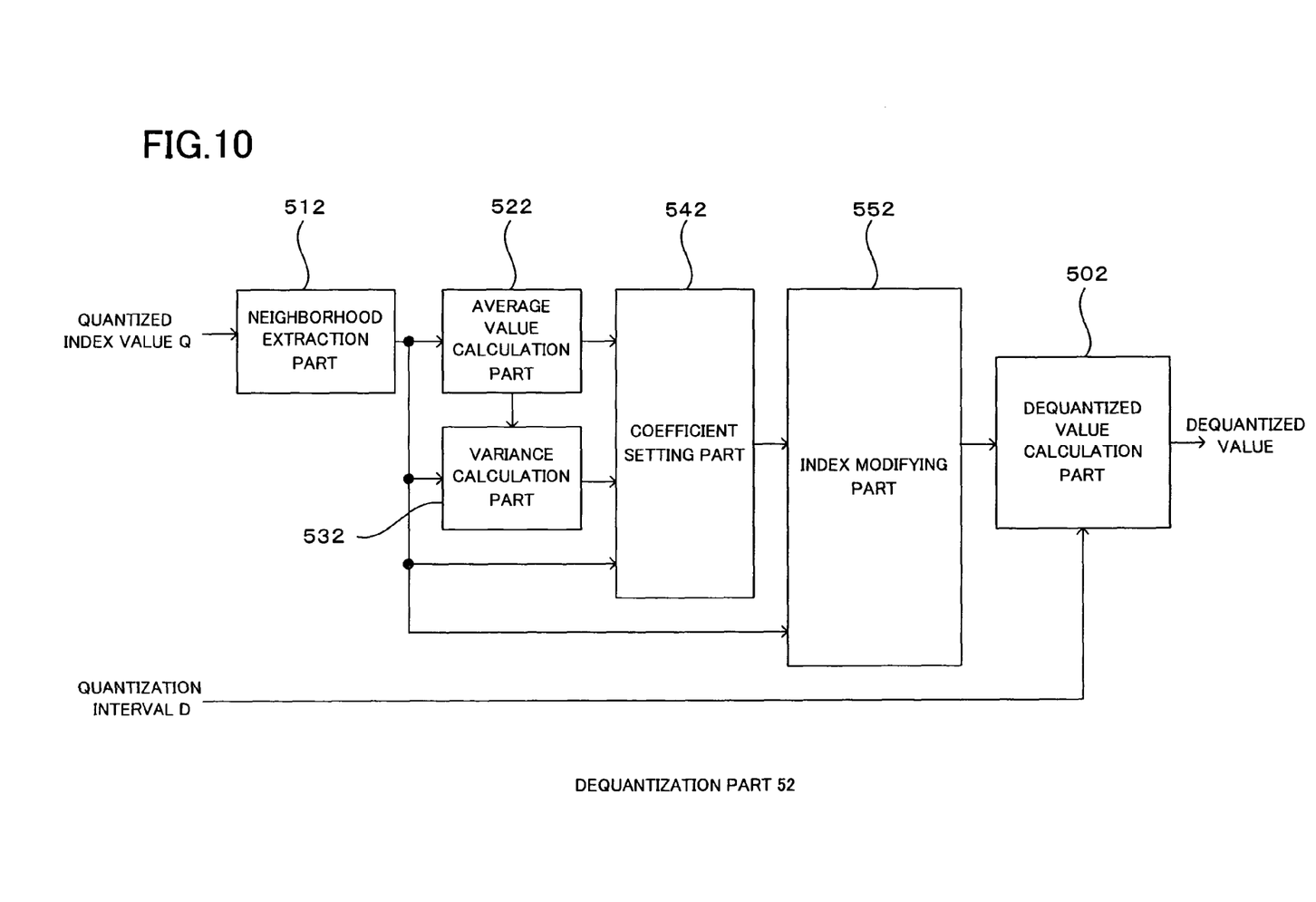
FIG. 10 illustrates a dequantization part 52 in a modification example 1.

FIG. 10 illustrates a dequantization part 52 in the modification example 1.

As illustrated in FIG. 10, a second dequantization part 52 includes a second dequantized value calculation part 502, a second neighborhood extraction part 512, a second average value calculation part 522, a second variance calculation part 532, a second coefficient setting part 542, and an index modifying part 552.

In the dequantization part 52, when modifying the quantized index value of a block of interest, the neighborhood extraction part 512 extracts the quantized index values of reference blocks and outputs the extracted quantized index values of the reference blocks and the quantized index value of the block of interest to the average value calculation part 522, the variance calculation part 532, the coefficient setting part 542, and the index modifying part 552.

When modifying the quantized index value Q(c, i, j) of a component of interest included in the block of interest, the neighborhood extraction part 512 of this example extracts the quantized index values Q(c, i+s, j+t) of the same component (same type) as the component of interest from the reference blocks around this block of interest.

The average value calculation part 522 calculates an average value M of the multiple quantized index values (the quantized index values of the block of interest and its reference blocks) input from the neighborhood extraction part 512 and outputs the calculated average value M to the variance calculation part 532 and the coefficient setting part 542.

The variance calculation part 532 calculates a variance N of the quantized index values, based on the multiple quantized index values (the quantized index values of the block of interest and its reference blocks) input from the neighborhood extraction part 512 and the average value M input from the average value calculation part 522, and outputs the calculated variance N to the coefficient setting part 542.

The coefficient setting part 542 sets modification coefficients for modifying the quantized index value, based on a distribution condition of the quantized index values extracted by the neighborhood extraction part 512.

The coefficient setting part 542 of this example calculates filter coefficients of a two-dimensional FIR filter, based on the average value M (the average of the quantized index values) calculated by the average value calculation part 522 and the variance N (the variance of the quantized index values) calculated by the variance calculation part 532.

The index modifying part 552 modifies the quantized index value of the block of interest, based on the modification coefficients set by the coefficient setting part 542 and the quantized index values of the reference blocks extracted by the neighborhood extraction part 512.

The index modifying part 552 of this example convolutes the quantized index values of the block of interest and its reference blocks, using the two-dimensional FIR filter (FIG. 9B) having the filter coefficients set by the coefficient setting part 542, thus calculating a modified quantized index value Q'.

The dequantized value calculation part 502 calculates a dequantized value based on the quantized index value modified by the index modifying part 552 and outputs the calculated dequantized value to the inverse transformation part (FIG. 6).

The dequantized value calculation part 502 of this example calculates a dequantized value, using the modified quantized index value Q' and the quantization step width D.

Figure 11:
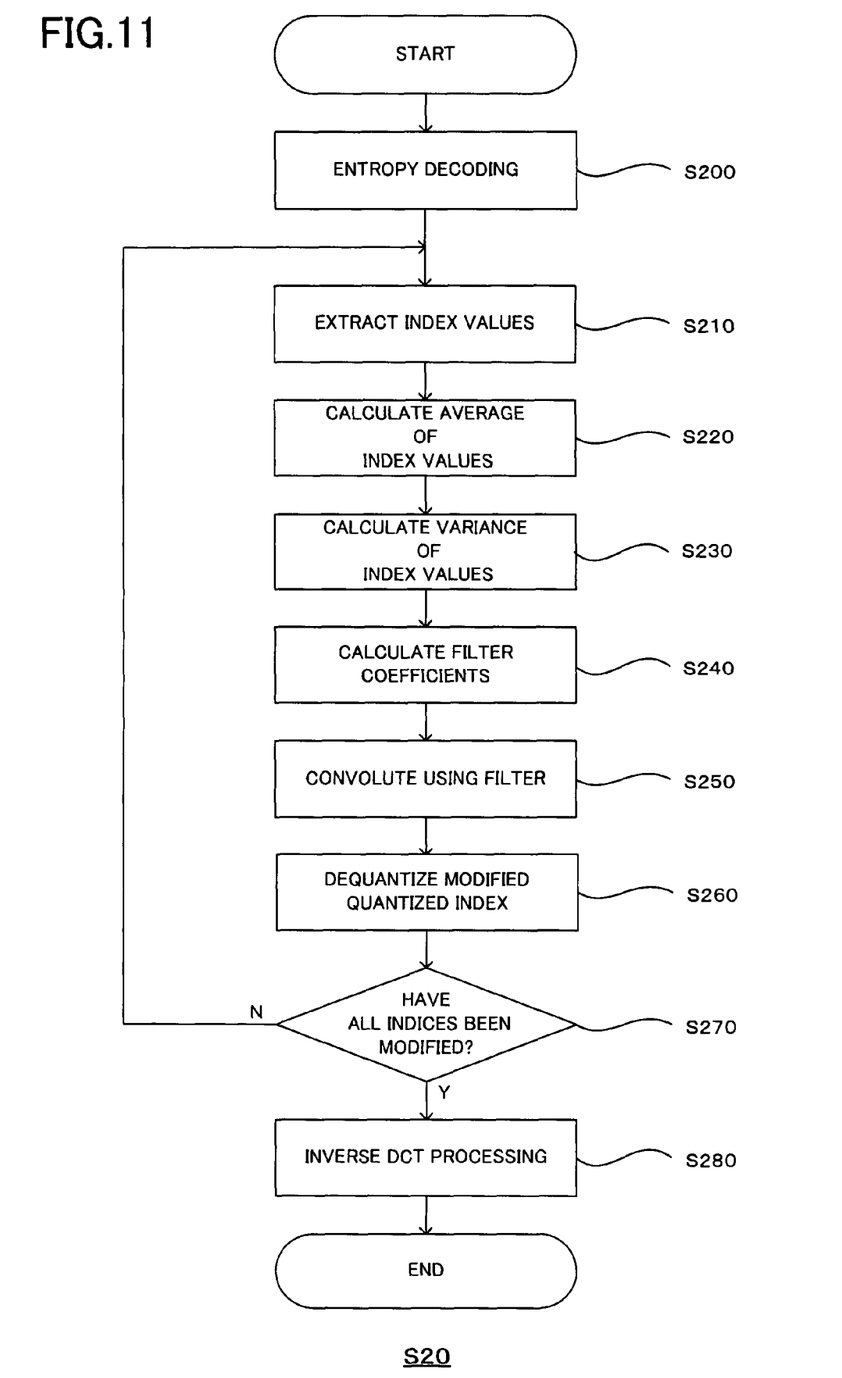
FIG. 11 is a flowchart illustrating a decoding process (S20) in the modification example 1.

FIG. 11 is a flowchart illustrating a decoding process (S20) in the modification example 1.

As illustrated in FIG. 11, at step 200 (S200), the entropy decoding part 40 (FIG. 6) decodes input coded data and outputs decoded quantized index values Q to the dequantization part 52.

At step 210 (S210), the neighborhood extraction part 512 (FIG. 10) selects the quantized index value Q(c, i, j) of a block of interest to be modified from among the quantized index values input from the entropy decoding part 40.

Moreover, the neighborhood extraction part 512 extracts quantized index values Q(c, i+s, j+t) of the same type (frequency component) with regard to the quantized index value Q(c, i, j) selected to be modified from multiple blocks including the block of interest (FIG. 9A).

Specifically, the quantized index values of the same type c are extracted from nine blocks (the block of interest and its reference blocks) illustrated in FIG. 9A.

The neighborhood extraction part 512 outputs the extracted quantized index values Q(c, i+s, j+t) to the average value calculation part 522, the variance calculation part 532, the coefficient setting part 542, and the index modifying part 552.

At step 220 (S220), the average value calculation part 522 calculates an average value M of the quantized index values Q(c, i+s, j+t) input from the neighborhood extraction part 512 and outputs the calculated average value M to the variance calculation part 532 and the coefficient setting part 542.

At step 230 (S230), the variance calculation part 532 calculates a variance N of the extracted quantized index values Q(c, i+s, j+t), based on the quantized index values Q(c, i+s, j+t) input from the neighborhood extraction part 512 and the average value M input from the average value calculation part 522, and outputs the calculated variance N to the coefficient setting part 542.

The variance N is obtained by squaring the difference between each quantized index value Q(c, i+s, j+t) and the average value M and dividing the sum of results by the number of the quantized index values (9 in this example).

At step 240 (S240), the coefficient setting part 542 calculates filter coefficients ($\alpha$ and W+$\alpha$) illustrated in FIG. 9B, using the average value M (the average of the quantized index values) input from the average value calculation part 522 and the variance N (the variance of the quantized index values) input from the variance calculation part 532, and outputs the calculated filter coefficients to the index modifying part 552.

In particular, as the coefficient W, the coefficient setting part 542 selects one which is larger of the results of the following calculation formulae C and D, if any result is equal to or greater than 0; otherwise, selects 0 if any result is less than 0.

Calculation formula $C=\{(\text{Variance } N \text{ of quantized index values})-1/12\}/(\text{Variance } N \text{ of quantized index values})$ Calculation formula $D=1-1/2|Q(c,i+s,j+t)-(\text{Average value } M \text{ of quantized index values})|$ Calculation formula D is a conditional expression to assure that a modified quantized index value falls within the quantization range.

Using the calculated coefficient W, the coefficient setting part 542 then calculates the coefficient $\alpha$ by the following equation:

Coefficient $\alpha=(1-W)/(2L+1)^2$

At step 250 (S250), the index modifying part 552 calculates a modified quantized index value Q' (c, i, j) by filtering the nine quantized index values Q(c, i+s, j+t) input from the neighborhood extraction part 512 by the two-dimensional FIR filter (FIG. 9B) using the filter coefficients input from the coefficient setting part 542 and outputs the calculated quantized index value Q'(c, i, j) to the dequantized value calculation part 502.

At step 260 (S260), the dequantized value calculation part 502 multiplies the quantized index value Q'(c, i, j) input from the index modifying part 552 by the quantization step width D(c) input from the entropy decoding part 40, thus calculating a dequantized value.

At step 270 (S270), the decoding program 52 determines whether all quantized index values have been modified; if so, the process proceeds to step S280, if at least a quantized index value yet to be modified remains, the process returns to step S210.

At step 280 (S280), the inverse transformation part 60 (FIG. 6) performs an inverse discrete cosine transform of the dequantized value input from the dequantization part 52 (FIG. 10), thus generating a decoded image.

In this way, in the present modification example, modifying the quantized index values is carried out instead of modifying the dequantized values. The quantized index values fall within a smaller dynamic range because they are modified before being multiplied by the quantization step width.

Unlike the filter coefficients calculating step (S150) in the foregoing exemplary embodiment, the filter coefficients calculating step (S240) does not need to use the quantization step width D(c) which depends on the frequency component c and, therefore, the calculation load becomes smaller.

MODIFICATION EXAMPLE 2

While, in the above-described exemplary embodiment, variance N is calculated by squaring the difference between each dequantized value S(c, i+s, j+t) and the average value M and dividing the sum of results by the number of the dequantized values, the variance may be obtained from the difference between the square mean of each dequantized value S(c, i+s, j+t) and the square of the average value M.

When a variance N of quantized index values is calculated, the variance N may be obtained from the difference between the square mean of each quantized index value Q(c, i+s, j+t) and the square of the average value M of the quantized index values.

MODIFICATION EXAMPLE 3

In the above-described exemplary embodiment, to assure quantization/dequantization within a quantization range, the following calculation formula B is used:

Calculation formula $B=1-D(c)/2|S(c, i+s, j+t)-(\text{Average value } M)|$

However, because it is not always necessary to assure quantization/dequantization within a quantization range, this formula B may be ignored.

In the aspect of the invention where quantized indices are modified (modification example 1), the relevant calculation formula D may be ignored for the same reason.

In this case, the coefficient setting part 540 (or the coefficient setting part 542) may set the filter coefficients without using the average value M.

MODIFICATION EXAMPLE 4

In the above-described exemplary embodiment and modification example 1, the two-dimensional FIR filter illustrated in FIG. 9B is used, which is presented as an example; however, the filter coefficients are not so limited.

For example, filter coefficients may be function values which are variables depending on a distribution condition (variance, average value, etc.) of dequantized values (or quantized index values) or a quantization step width or the above filter coefficients ($\alpha$ and $W+\alpha$) weighted with specified weighting factors (for example, multiplied by different weighting coefficients for a center component, vertical/horizontal components, and other components) and others.

OTHER MODIFICATION EXAMPLES

While, in the above-described exemplary embodiment and modification example 1, a block transform coding scheme is applied by way of illustration, a wavelet transform coding scheme such as JPEG 2000 may be applied.

Also in this case, it is possible to extract transform coefficients of the same type from adjacent space regions. For example, in the wavelet transform coding scheme, it is possible to divide an input image into multiple frequency bands, regard the frequency-divided image signal as a bitmap image having a two-dimensional extent like an input image, and filter the bitmap with a filter as illustrated in FIG. 9B.

Figure 12:
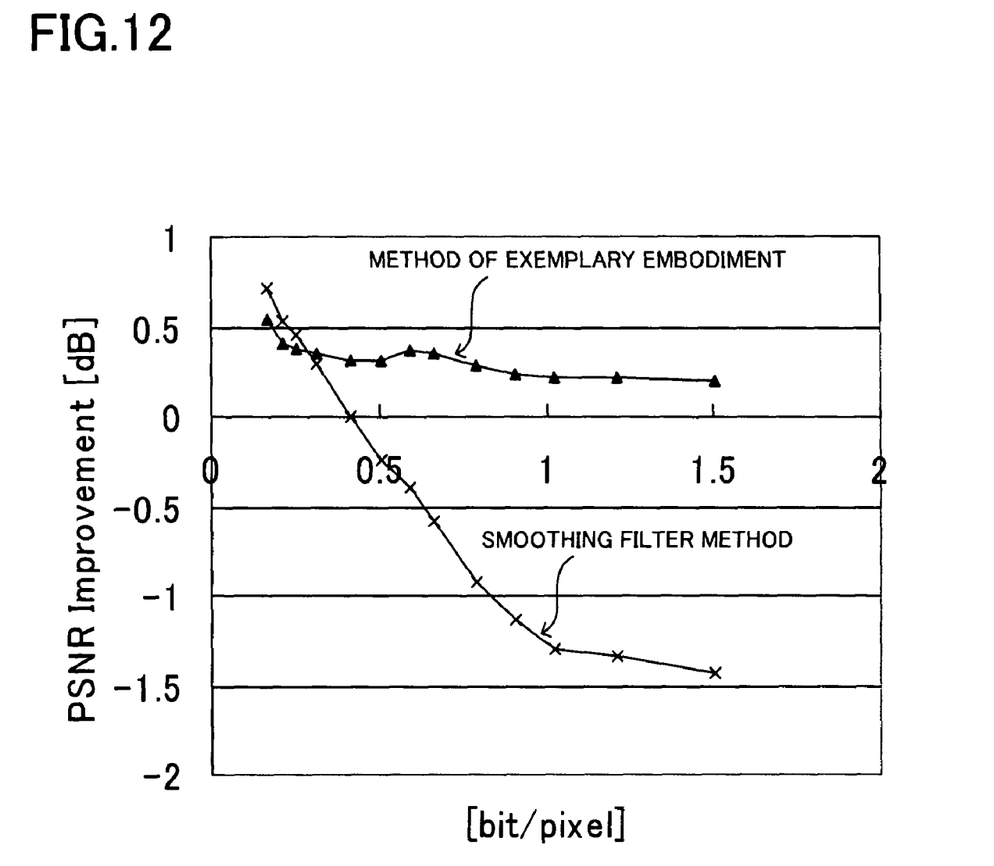
FIG. 12 is a graph showing experiment results.

FIG. 12 is a graph showing experiment results.

In FIG. 12, an 8-bit-per-pixel monochrome image is compressed by JPEG and this graph indicates results of decoding this image by JPEG standard method, by a smoothing filter method, and by the method of the foregoing exemplary embodiment. The abscissa denotes the bit rate [bit/pixel] at which the image is compressed by JPEG. The ordinate denotes improvements in PSNR [dB] relative to the JPEG standard method.

As shown in FIG. 12, the decoding method of the foregoing exemplary embodiment exhibits positive values at all bit rates.

The present invention may be embodied in other specific forms without departing from its spirit or essential characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A decoding apparatus that decodes data encoded by transform coding in units of predefined image areas, comprising:
   a coefficient setting unit that sets modification coefficients for each of the image areas using a processor; and
   a dequantized value generating unit that generates a dequantized value corresponding to a first quantized index value of a target area which is an image area to be modified, based on the first quantized index value of the target area, a second quantized index value of other image area in predetermined relative position to the target area, and the modification coefficients set by the coefficient setting unit.

2. The decoding apparatus according to claim 1, wherein the dequantized value generating unit includes
   an index modifying unit that modifies the first quantized index value, using the modification coefficients set by the coefficient setting unit and the second quantized index value; and
   a dequantized value calculation unit that calculates the dequantized value, using the first quantized index value modified by the index modifying unit, and a quantization interval.

3. The decoding apparatus according to claim 1, wherein the dequantized value generating unit includes
   a dequantized value calculation unit that calculates a first temporary dequantized value of the target area and a second temporary dequantized value of the other image area, using the first quantized index value, the second quantized index value and a quantization interval; and
   a quantized value modifying unit that modifies the first temporary dequantized value calculated by the dequantized value calculation unit, using the second temporary dequantized value calculated by the dequantized value calculation unit, and the modification coefficients set by the coefficient setting unit.

4. The decoding apparatus according to claim 1, wherein the coefficient setting unit sets the modification coefficients for the target area, based on the first quantized index value or a first temporary dequantized value corresponding to the first quantized index value, and the second quantized index value or a second temporary dequantized value corresponding to the second quantized index value.

5. The decoding apparatus according to claim 4,
   wherein the coefficient setting unit sets modification coefficients for convolution, based on a distribution condition of the first quantized index value and the second quantized index value, or a distribution condition of the first temporary dequantized value and the second temporary dequantized value; and
   the dequantized value generating unit generates the dequantized value of the target area by convoluting the first quantized index value and the second quantized index value, or the first temporary dequantized value and the second temporary dequantized value, using the modification coefficients for convolution set by the coefficient setting unit.

6. The decoding apparatus according to claim 1, wherein the coefficient setting unit sets the modification coefficients so that the dequantized value generated by the dequantized value generating unit falls within a quantization domain defined for the first quantized index value.

7. The decoding apparatus according to claim 4,
   wherein the coefficient setting unit extracts the first quantized index value and the second quantized index value of a frequency component, or the first temporary dequantized value and the second temporary dequantized value of the frequency component and sets the modification coefficients for the target area, based on a variance of the extracted first quantized index value and the extracted second quantized index value, or the extracted first temporary dequantized value and the extracted second temporary dequantized value; and the dequantized value generating unit extracts the first quantized index value and the second quantized index value of the frequency component, or the first temporary dequantized value and the second temporary dequantized value of the frequency component and generates the dequantized value corresponding to the first quantized index value of the target area, using the extracted first quantized index value and the extracted second quantized index value, or the extracted first temporary dequantized value and the extracted second temporary dequantized value, and the modification coefficients set by the coefficient setting unit.

8. The decoding apparatus according to claim 2, wherein the coefficient setting unit calculates a first filter coefficient (W+α) and a second filter coefficient (α), using a distance L from a reference block to a center of the block of interest and a variance N of quantized index values of one frequency component included in a set of image areas with a predetermined size around the target area and the following equations:

$$W = \{N - 1/12\}/N$$

$$\alpha = (1-W)/(2L+1)^2; \text{ and}$$

the index modifying unit obtains the modified first quantized index value by filtering the quantized indices of a set of (2L+1)×(2L+1) image areas around the target area by a (2L+1)×(2L+1) two-dimensional filter in which the first filter coefficient (W+α) is in a center position and the second filter coefficients α are in other surrounding positions.

9. A dequantization method that dequantizes quantized indices transformed in units of predefined image areas, comprising:

setting modification coefficients for each of the image areas; and generating a dequantized value corresponding to a quantized index value of a target area which is an image area to be modified, based on the quantized index value of the target area, a quantized index value of other image area in predetermined relative positions to the target area, and the modification coefficients which have been set.

10. A non-transitory computer readable medium storing a program causing a computer to execute a process for decoding data, the process comprising:

setting modification coefficients for each of image areas; and generating a dequantized value corresponding to a quantized index value of a target area which is an image area to be modified, based on the quantized index value of the target area, a quantized index value of other image area in predetermined relative positions to the target area, and the modification coefficients which have been set.

* * * * *